(12) United States Patent
Lentz

(10) Patent No.: US 10,895,664 B2
(45) Date of Patent: Jan. 19, 2021

(54) MULTI-MATERIAL DENSITY WELL LOGGING SUBASSEMBLY

(71) Applicant: CORDAX EVALUATION TECHNOLOGIES INC., Calgary (CA)

(72) Inventor: Curtis Lentz, Calgary (CA)

(73) Assignee: CORDAX EVALUATION TECHNOLOGIES INC., Calgary (CA)

(*) Notice: Subject to any disclaimer, the term of this patent is extended or adjusted under 35 U.S.C. 154(b) by 0 days.

(21) Appl. No.: 16/258,373

(22) Filed: Jan. 25, 2019

(65) Prior Publication Data

US 2019/0227189 A1    Jul. 25, 2019

Related U.S. Application Data

(60) Provisional application No. 62/621,922, filed on Jan. 25, 2018.

(51) Int. Cl.
*G01V 5/00* (2006.01)
*G01V 5/12* (2006.01)

(52) U.S. Cl.
CPC .................. *G01V 5/12* (2013.01)

(58) Field of Classification Search
CPC ............... G01V 5/12; G01V 5/125
See application file for complete search history.

(56) References Cited

U.S. PATENT DOCUMENTS

2006/0065394 A1   3/2006   Clark et al.
2011/0284731 A1*  11/2011  Roscoe ............ G01V 5/101
                                                  250/269.3

* cited by examiner

*Primary Examiner* — Dani Fox
(74) *Attorney, Agent, or Firm* — Bennett Jones LLP

(57) ABSTRACT

A sub adapted for injection into the wellbore and sensing, the sub comprising: (a) an elongated body; (b) an inner bore having multi-material spacers of different radiation transparencies; and (c) an outer wall having recessed portions along an outside diameter, forming circumferential windows configured to align with a radioactive source and sensors and configured to guide a radioactive energy's path into a formation and back to sensor.

6 Claims, 11 Drawing Sheets

Section A-A

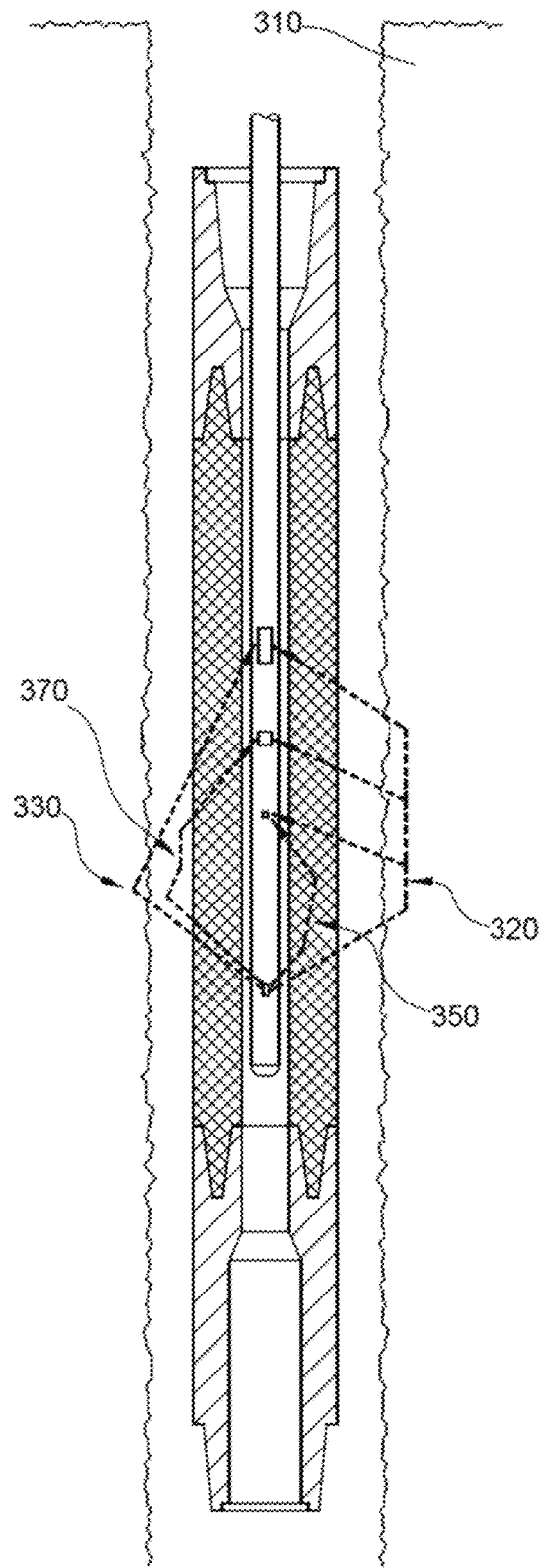
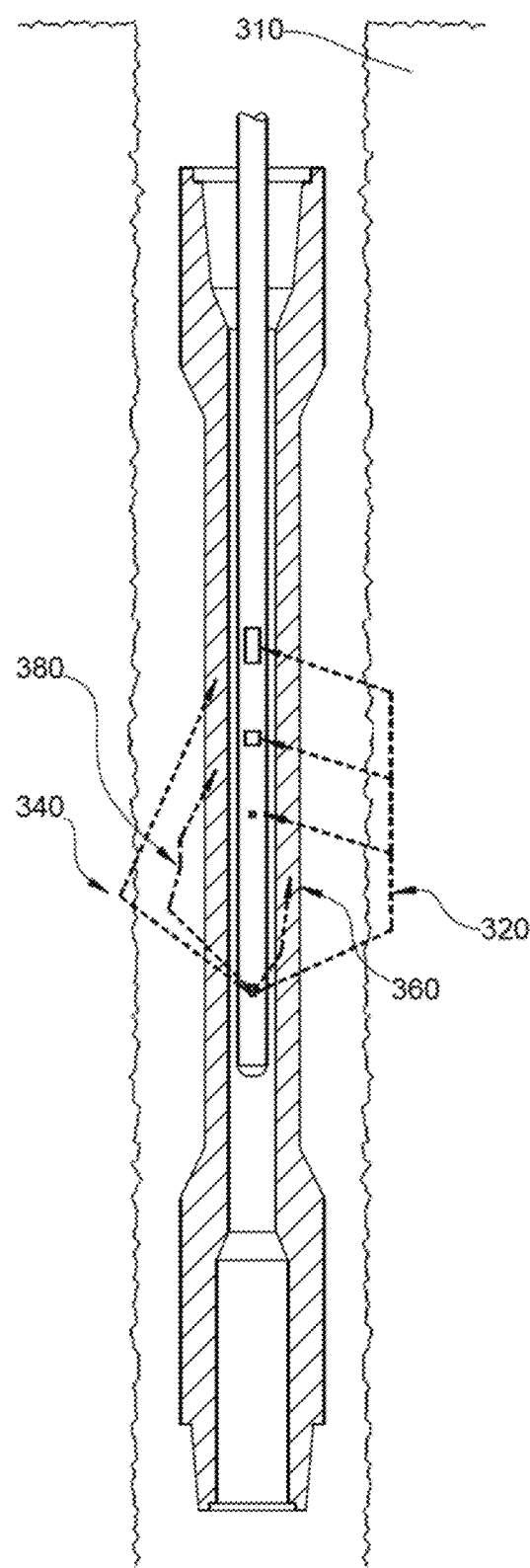
Fig. 5a
Fig. 5b

PRIOR ART

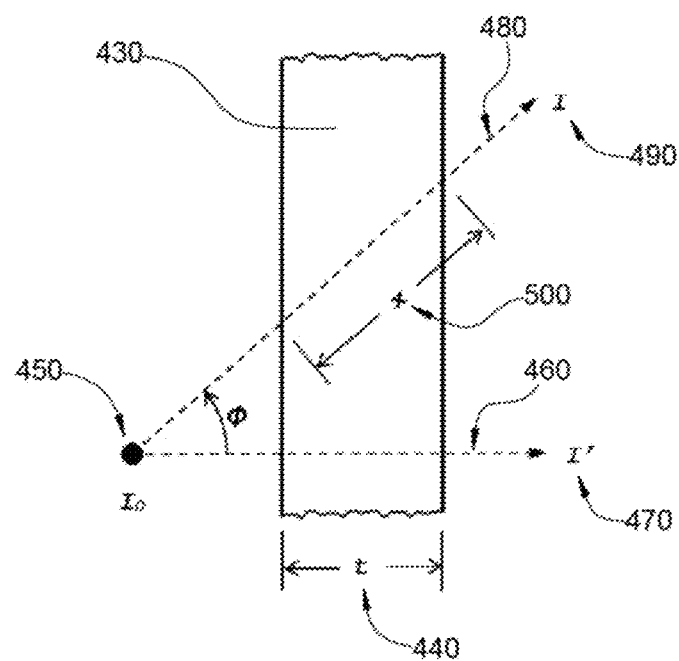
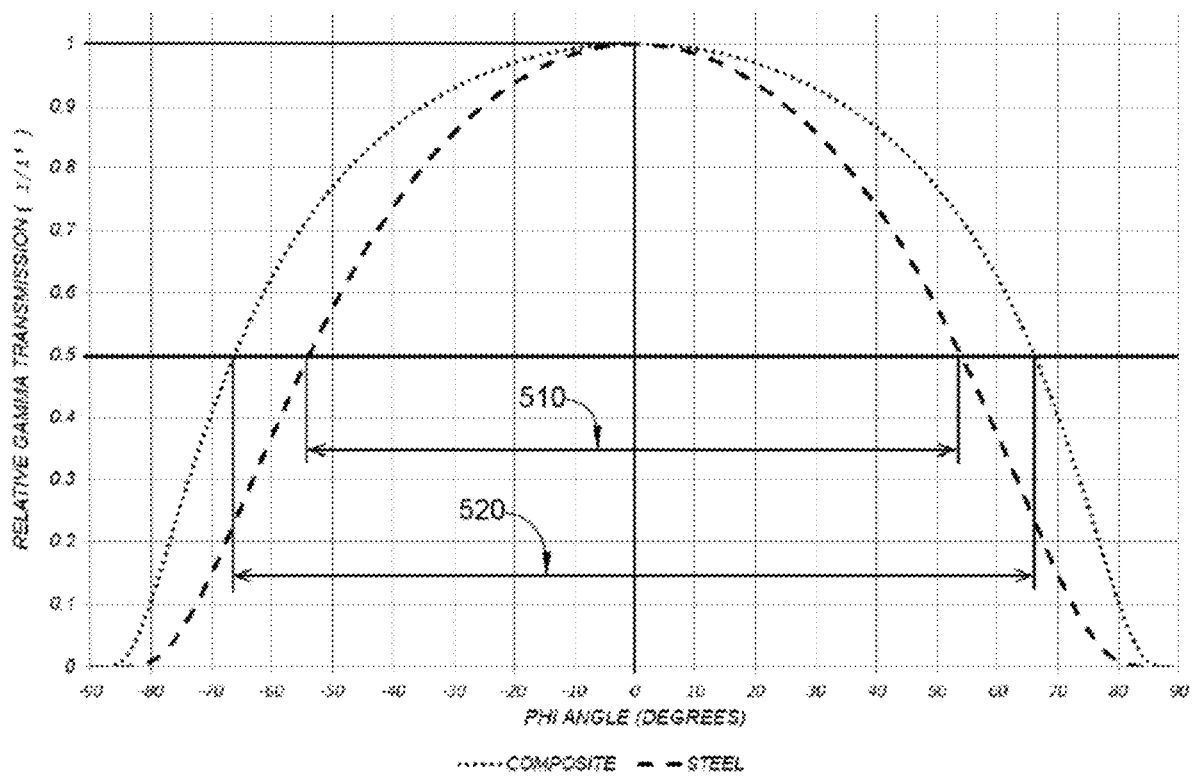
Fig. 8

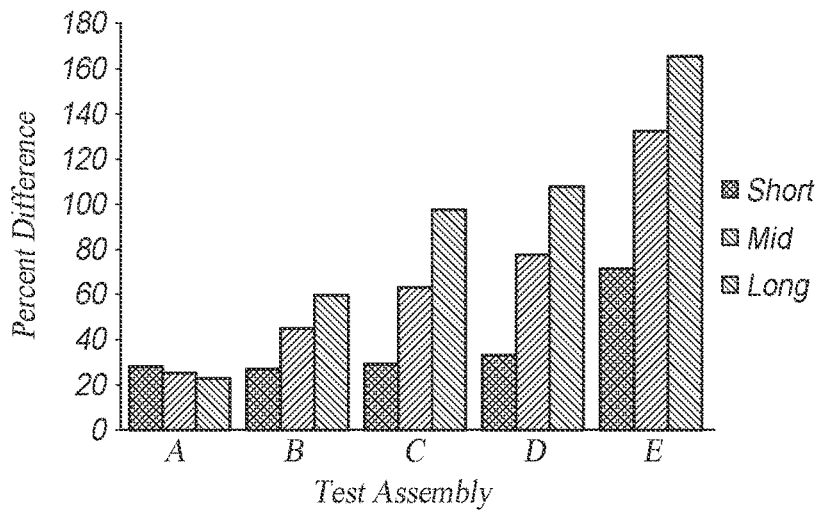

Test results comparing "KPI" Key Performance Indicator of the percent difference in count rates, for each of the Long, Mid, and Short spacings of detectors, between two test blocks of identical through borehole diameter but differing density.

Test:  Run-in density tool in test blocks with
- A   air filled bore with no tabular sub present
- B   water filled bore with no tabular sub present
- C   water filled bore with composite body of prior art
- D   water filled bore with steel tabular body of prior art
- E   water filled bore with test mock-up of present invention

Fig. 9

MULTI-MATERIAL DENSITY WELL LOGGING SUBASSEMBLY

FIELD OF THE INVENTION

This invention relates generally to the investigation of sub-surface earth formations, and more particularly, to techniques for determining formation density properties through a multi-material downhole tubular subassembly using an insertable and retrievable well logging tool equipped with a nuclear radiation source and detectors.

BACKGROUND OF THE INVENTION

Well logging is the practice of making a detailed record (a well log) of the geologic formations penetrated by a borehole. The log may be based either on visual inspection of samples brought to the surface (geological logs) or on physical measurements made by instruments conveyed in the hole (geophysical logs) by means of a wire-line or with tubular drill pipe.

The method of scattered gamma ray logging, or gamma-gamma logging as it is sometimes called, relies on the principle of Compton scattering. A source of gamma ray radiation provided by a small quantity of cesium-137, radioactive or other appropriate material disposed within the instrument, commonly referred to as the logging tool, is used to irradiate the materials surrounding the logging tool and the rock surrounding the borehole. A detector, or series of more than one detector, may be disposed within the instrument to intercept gamma rays and allow for a recording of their energy and intensity with respect to the depth of the instrument within the borehole. The detectors are commonly composed of a scintillation crystal bonded to a photomultiplier tube to produce an electrical signal proportional to the energy deposited by a gamma ray intercepted by the crystal. While the scintillation detector is the most common, Geiger-Muller tubes and semiconductor junctions are other possible types of gamma ray detectors. Between the source and detector, shielding materials are placed to prevent gamma rays from directly, or indirectly, arriving at the detectors from the source without interacting with the surrounding rock. The detectors are separated by a fixed axial distance, or spacing, from the source to maximize the effect of the desired gamma ray interactions with the surrounding matter prior to being intercepted by the detectors (upon returning to the instrument from the rock). According to the average electron density characteristics of the matter surrounding the instrument, more or less of the gamma rays will be absorbed or scattered back to the detectors. Since the relationship between the average electron density and the bulk density of typical earth material encountered is commonly assumed to be proportional, the density logging tool can be considered as measuring the bulk density of the formation. Depending on the spacing between the source and detector, a relative increase of the bulk density of the formation may cause the count rate of detected gamma rays to increase, decrease, or at intermediate spacings have no effect. The source to detector spacing also influences the depth of investigation, so that a combination of detectors with different spacings may be used in conjunction with each other to compensate for undesirable variations of the borehole environment between the tool and the formation, such as irregular borehole shape and mudcake.

A density logging tool may typically run in open-hole (uncased well bore) to provide valuable measurements for lithologic determination and formation evaluation. The bulk density measurement is frequently used to produce a porosity estimate of the formation. When combined with other logging tools measurements, it can help detect gas and/or oil-bearing formations, indication of clay content, and calculation of water saturation. In addition, the density logging tool typically provides a mechanical measurement of the borehole's diameter.

Logging while drilling (LWD) is a technique of conveying well logging tools into the well borehole as part of the bottom hole assembly (BHA). LWD, while risky and expensive, has the advantage of measuring properties of a formation before drilling fluids invade the borehole deeply. Furthermore, some wellbores can be difficult to measure with wireline tools, for example deviated and horizontal wells. In these situations, the LWD measurement can collect data where wireline operations may be difficult, or impossible.

Logging While Tripping (LWT) is a cost-effective alternative to the LWD method. In LWT, a small diameter run-in tool is placed downhole through the drill pipe, usually when the bit is at the bottom of the borehole, just before the drill pipe is pulled out of the well. The run-in tool is used to measure the downhole physical properties of the formations as the drill string is extracted or tripped out of the hole. Measured data may be recorded into the tool's memory and plotted against the time of the trip out. At surface, a second set of equipment can record bit depth versus time of the trip out allowing measurements to be correlated to the depth of the tool within its trip put of the borehole.

While current LWT techniques incorporating gamma-gamma density measurement have been proven in the market, there remains a desire for improved measurements. The current technique of density measurement through steel tubular does not allow for scenarios where the drill pipe used is of the largest typical oilfield tubular size and still have the ability to obtain an effective density measurement, while exceeding the strength properties of the rest of the drill string. A need remains for simplified, reliable and retrievable radiation-source systems for locating and evaluating the properties of potential hydrocarbons in sub-surface formations.

SUMMARY OF THE INVENTION

In one embodiment the invention provides a "subassembly" or a sub adapted for injection into the wellbore and sensing, the sub comprising: (a) an elongated body; (b) an inner bore having multi-material spacers of different radiation transparencies; and (c) an outer wall having recessed portions along an outside diameter, forming circumferential windows configured to align with a radioactive source and sensors and configured to guide a radioactive energy's path into a formation and back to sensor.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein:

FIGS. 5*a*, 5*b* is a cross-section of prior art showing gamma ray paths;

FIG. 8 is a diagram and table showing gamma ray transmission through a sub wall;

FIG. 9 is a diagram comparing key performance indicators for spacings of detectors;

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1:
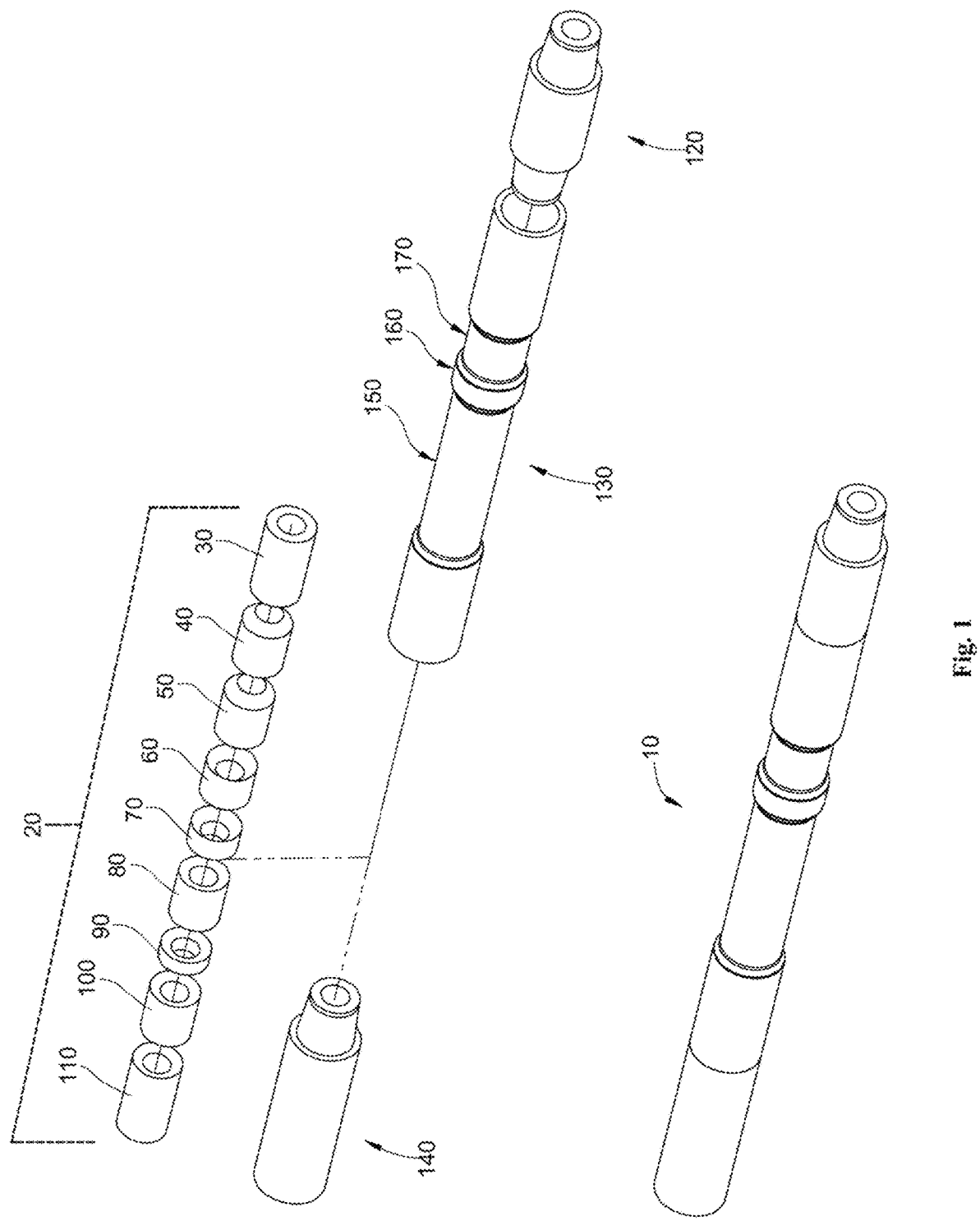
FIG. 1 is an isometric projection of a multi-material density well logging subassembly ("sub")

FIG. 1 shows an assembled multi-material density drill collar or sub 10 and an exploded view of the same. The exploded view shows the internal assembly of inserts or spacers 20. In the illustrated embodiment, inserts or spacers 30, 50, 70, 90 and 110 (which spacers may be referred to as "shielding inserts") are configured to be radio-opaque, allowing less gamma ray flux to pass through the sub relative to the other spacers 40,60,80,100. Spacers 40, 60, 80 and 100 (which spacers may be referred to as "window inserts" or "window spacers") are configured to allow relatively more gamma ray flux to pass through. Shielding insert 30 is below the source 240 and source window insert 40. Window insert 40 is adjacent to the source 240. Shielding insert 50 is between the source 240 and a short-space detector 250. Window insert 60 is adjacent to the short-space detector 250. Shielding insert 70 is between the short-space detector 250 and a mid-space detector 260. Window insert 80 is adjacent to the mid-space detector 260. Shielding insert 90 is between the mid-space detector 260 and a long-space detector 270.

Window insert 100 is adjacent to the long-space detector 270. Shielding insert 110 is above the long-space detector 270. A pin-end adaptor 120 is configured to connect with a drill string and contain inserts inside housing 130. The housing 130 contains inserts, maintains a fluid tight seal between inner annulus 220 and the environment (the wellbore), and transmits drill string torque, compression, and tension through it between the drill string above and below. Box-end adapter 140 is configured to connect with the drill string and contain inserts 20 inside housing 130. Detector housing windows 150, 170 have a reduced outside diameter with respect to the rest of the housing to provide a thinner wall for gamma rays to more easily pass through. Detector housing window 170 is adjacent to window insert 40, and detector housing window 150 is adjacent to window inserts 60,80,100. Housing wear band shield 160 is a section of enlarged outside diameter relative to the housing windows 150, 170 outside diameters, between the source 240 and detectors 250,260,270.

Figure 2:
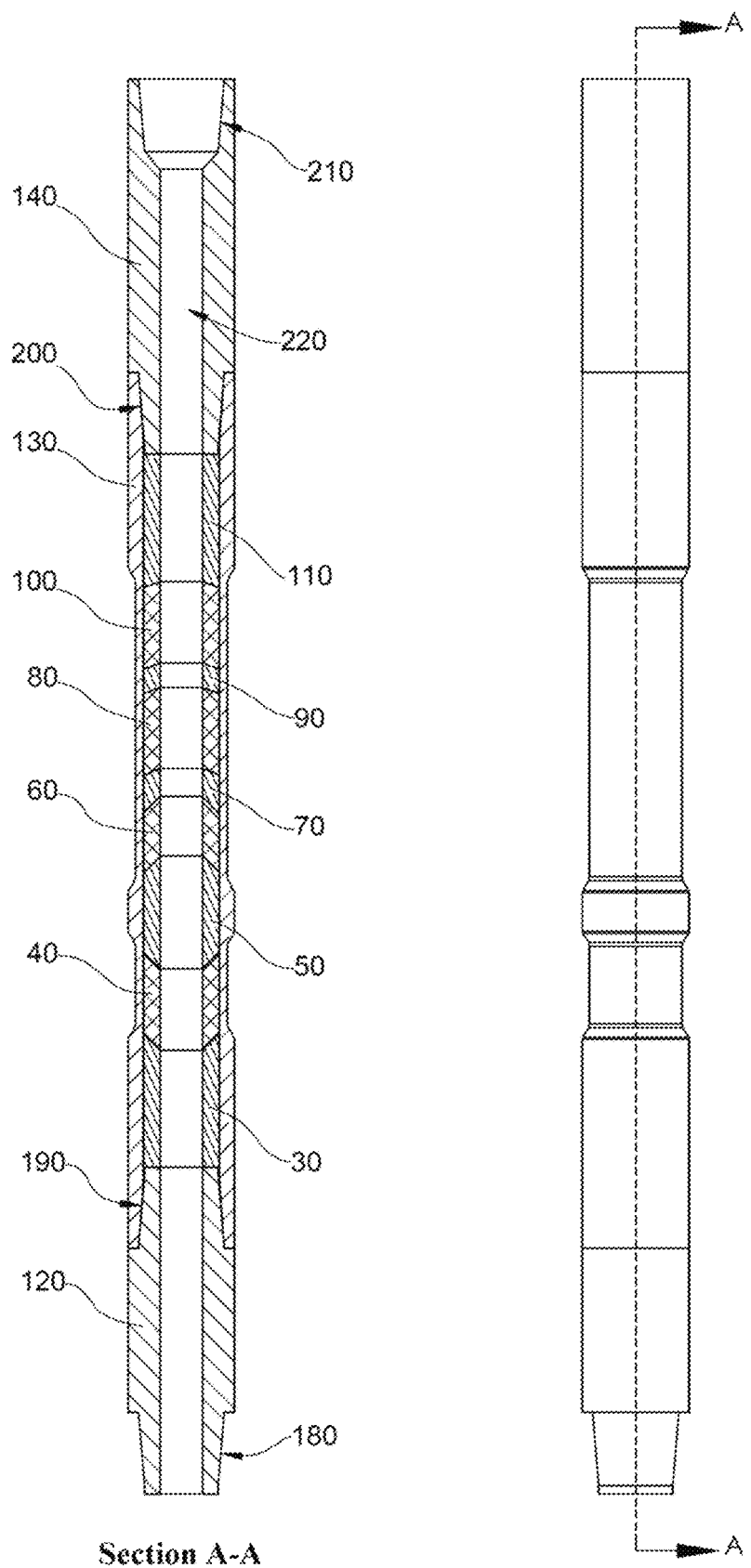
FIG. 2 is a sectional view along an A-A cut plane of a sub.
Figure 3:
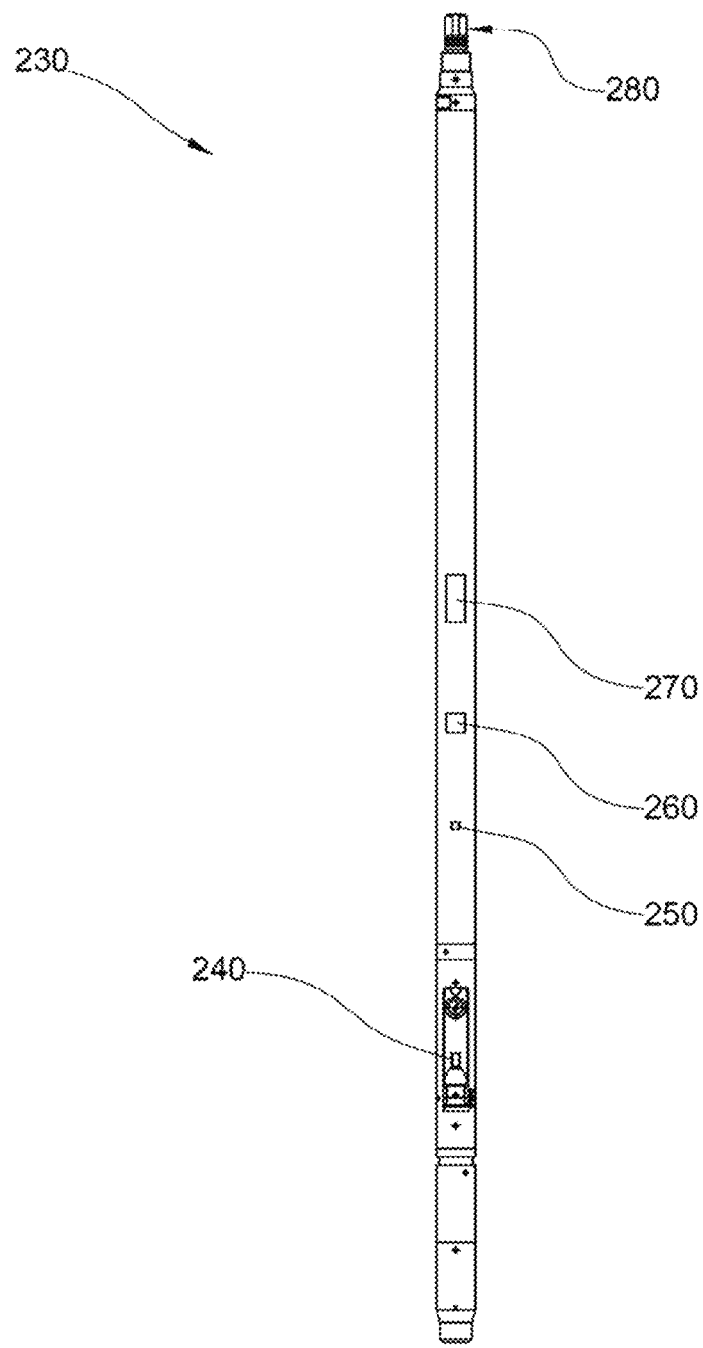
FIG. 3 is an elevation view of a run-in density tool.

FIG. 2 shows a pin-end drill pipe connection 180 for connecting drill string below. Shop connection 190 on pin-end adaptor 120, and shop connection 200 on box-end adaptor 140, allow for uncoupling (for example, unthreading) in a shop for repair, replacement or removal of inserts 20. Box-end drill pipe connection 210 allows for connection to a drill string. In FIG. 2, inner annulus or inner bore 220 of sub is shown without run-in tool 230.

FIG. 2 shows a density run-in tool 230 with the positions located of source 240 and detectors or sensors 250 (short-space detector), 260 (mid-space detector), 270 (long-space detector), which are positioned concentrically within the density run-in tool 230 to allow conveyance through the inside of a drill pipe. Source material 240 is positioned within the run-in tool 230 concentric with the tool's longitudinal axis. A run-in tool connector 280 is configured to connect to other logging tools for transmitting electrical data signals and a system for pumping down the well's bore, latching the run-in tool in a predetermined position in the well, and retrieving the run-in tool.

Figure 4:
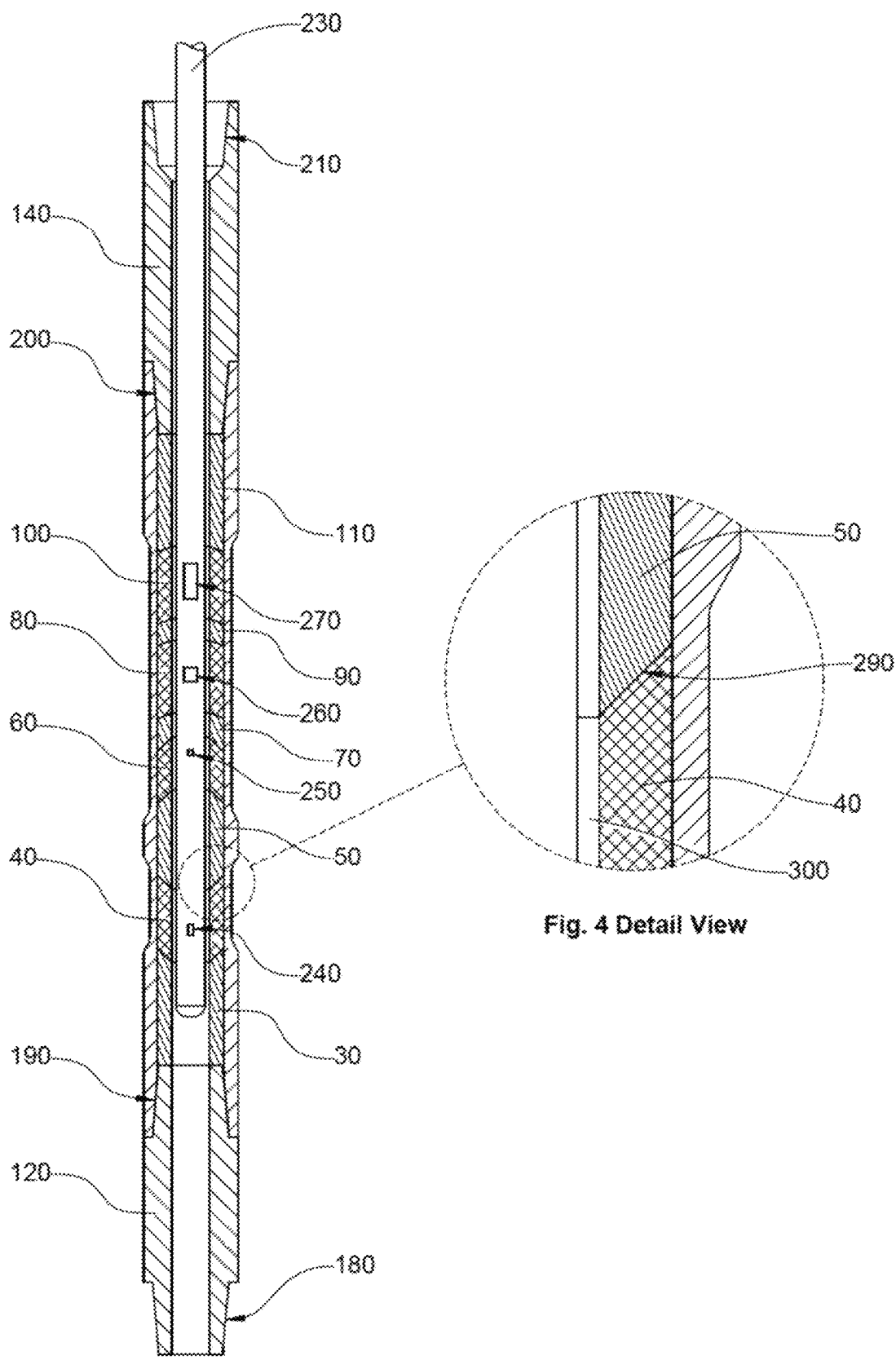
FIG. 4 is an elevational, cross-sectional view of a run-in sensing tool installed in the inner bore of a sub.

FIG. 4 shows the density run-in tool 230 positioned within a cross-sectional view of the sub 10. A detail view shows an example of the tapered interface that exists between the inserts, with tapered interface 290 between inserts 40 and insert 50. Annulus 300 is a space between the run-in tool 230 and the inner bore of the inserts 20 to allow drilling fluid to pass through.

Figure 6:
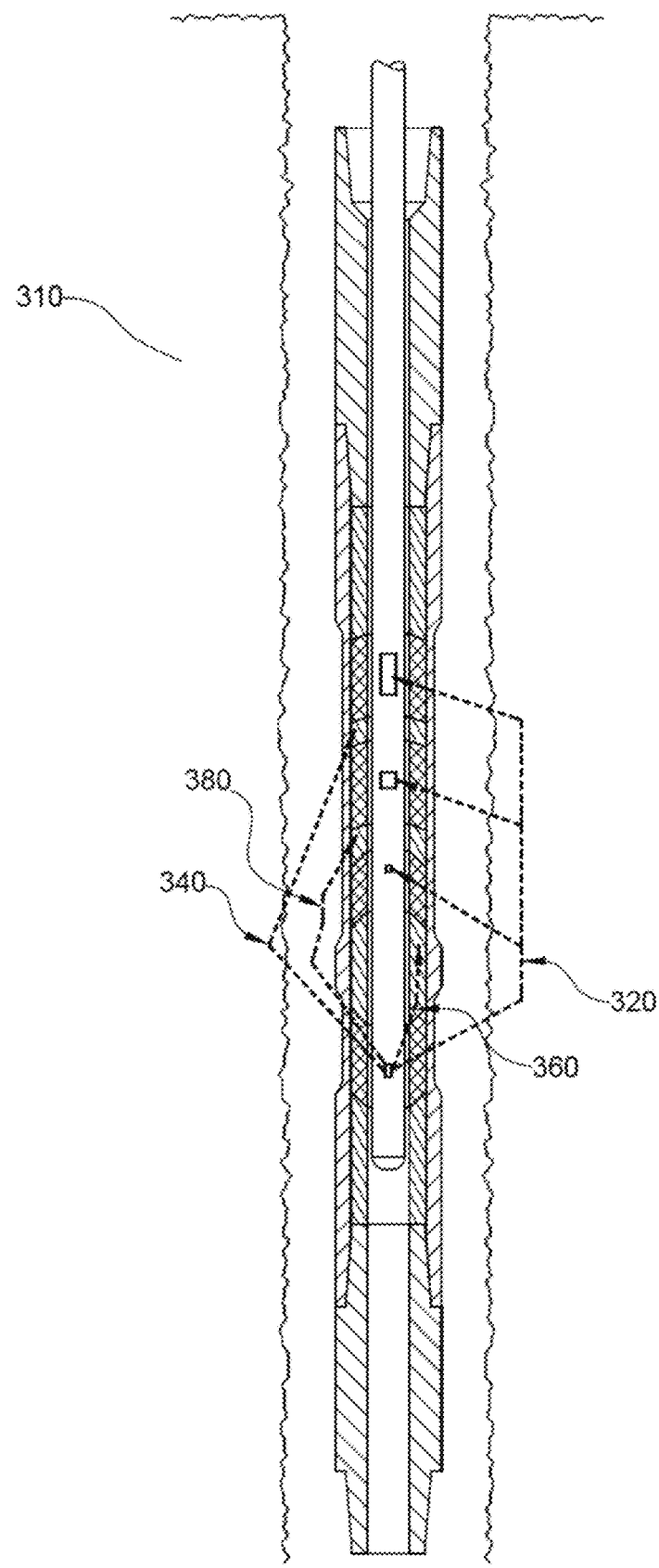
FIG. 6 is a cross-section of a sub in a wellbore showing gamma ray paths.

FIGS. 5*a* and 5*b* each show a prior art sub within a formation 310. The sub in FIG. 5*a* is made of composite material, and the sub in FIG. 5*b* is made of steel. FIG. 6 shows the sub 10 of the present invention within a formation 310. Preferred gamma ray paths 320 are illustrated in dotted lines for the three detectors. Gamma rays travel from the source to the formation, Compton scattering occurs in the formation, and then gamma rays return to the detectors. Single Compton backscatter gamma ray path 330 is an undesirable path of detected gamma rays, because it adds a positive correlation of detected gamma rays with respect to the formation density. A single Compton backscatter gamma ray path 340 is shown in FIG. 5*b* as being captured before reaching the detector, due to the geometry of its path being longer through the steel wall of the sub than path 320. Undesirable gamma ray scattering path 350 is shown as moving along the composite material and reaching the detector without first reaching the formation. Gamma ray scattering path 360 along the steel tubular is captured before reaching detector, due to the shielding characteristics of steel. Undesirable gamma ray scattering path 370 travels through borehole fluid and reaches the detector without first reaching the formation. Gamma ray scattering path 380 travels through borehole fluid and is captured by the steel tubular before reaching the detector due to the geometry of its path being longer through the steel wall of the sub than path 320.

FIG. 6 Shows the density sub 10 with run-in tool within a formation 310. Preferred gamma ray paths 320 are illustrated in dotted lines for the three detectors. The source window allows gamma rays to travel from the source to the formation, Compton scattering occurs in the formation, and then gamma rays return to the detectors through the detector windows. A single Compton backscatter gamma ray path 340 is shown as being captured by a shield insert. Gamma ray scattering path 360 along the sub is captured by a shield insert before reaching a detector. Gamma ray scattering path 380 travels through borehole fluid and is captured, in this case by a shield insert before reaching the detector due to the geometry of its path to a detector not being ideal to pass through a window, as in path 320.

Figure 7A:
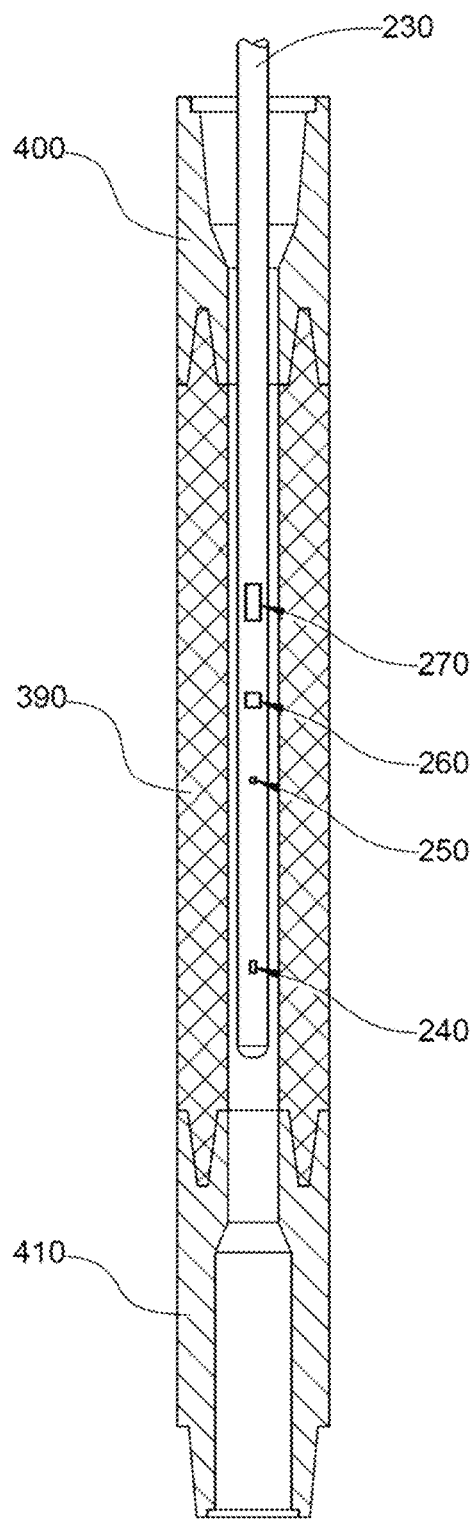
FIGS. 7*a*, 7*b* are cross-section examples from the prior art of logging subs with run-in density logging tools.
Figure 7B:
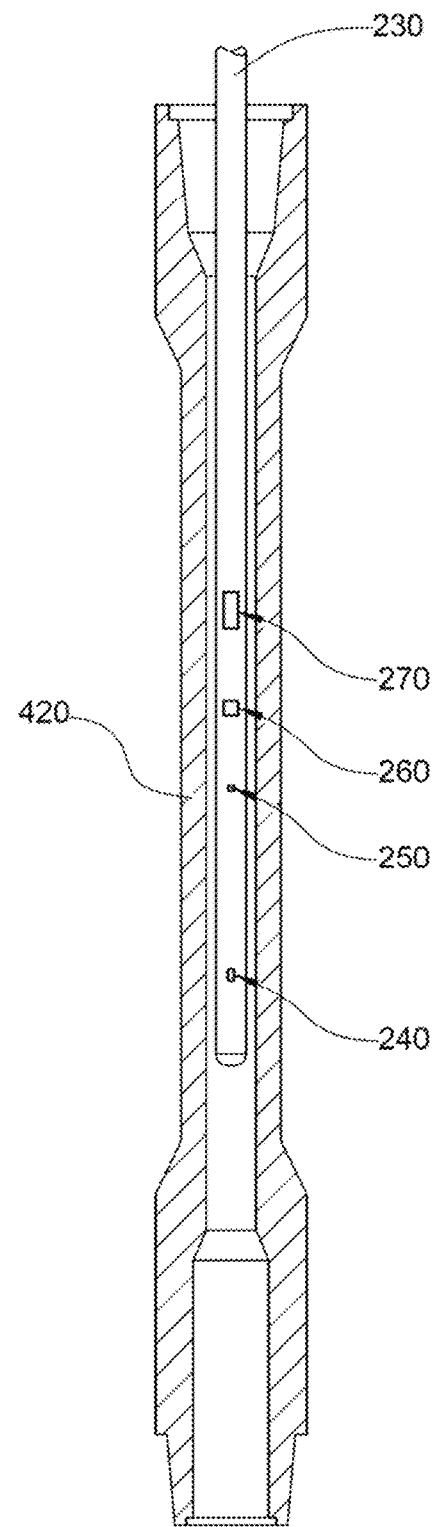

FIGS. 7*a* and 7*b* each show a prior art sub with a run-in sensing tool 230 installed, with source 240 and detectors 250, 260, 270 positioned within. The sub in FIG. 7a has a composite material body 390, and the sub in FIG. 7b is made of a steel tubular 420. The composite body 390, made of low density and low Z material from prior art, allows gamma rays to readily pass therethrough. Box end tool joint 400 and pin-end tool joint 410 are coupled (for example, bonded) to the composite body 390 and allow for connection to the drill string. Steel tubular 420 from the prior art has a reduced wall thickness around the run-in density tool to act as a window to allow gamma rays to pass therethrough.

FIG. 8 shows a generalized cross-section of wall material 430 composing a drill string tubular body. The wall has a thickness 440 or t. The radioactive source 450 is positioned on one side of the wall material 430. A possible path 460 of gamma rays is illustrated as travelling from the source 450 through the wall material 430, normal (i.e., perpendicular) to the wall 430. It is noted that path 460 is the shortest path through wall material 430, subject to attenuation due to the wall material 430. In other words, the gamma rays may have a relatively stronger intensity $I_0$ at position 450 than I' at position 470 along the path 460.

A possible path 480 of gamma rays is illustrated as travelling through the wall at an angle $\phi$ from the normal to the wall 430, resulting in a decreased intensity I at position 490, which is less than the relatively strong intensity I' 470, due to the longer distance 500 or x travelled through wall material 430 at angle $\phi$. Therefore, it can be understood that the geometry of the wall material 430 and source 450 has a significant effect on the intensity of gamma rays transmitted through the wall of a drill string tubular body, or sub, with respect to the angle through the source that is perpendicular to the wall 430. An intensity of transmitted gamma rays with respect to this angle $\phi$ can be plotted.

Full Width Half Maximum (FWHM) 510 for prior art steel tubular and FWHM 520 for prior art composite tubular are plotted on the graph in FIG. 8, illustrating their relative gamma ray transmission with respect to transmission angle from normal. In other words, the FWHM is a quantitative indication of the axial focusing produced by a tubular sub.

The present invention is intended to improve upon the prior art by focusing of the gamma-ray transmission through the tubular body of the sub 10 by way of the insert assembly 20 and windows 150, 170 to obtain the desired gamma ray paths 320 while minimizing the detection of gamma rays along paths 330, 350, 370.

The apparatus of the invention comprises a drill collar or subassembly 10, which is henceforth referred to as the "sub" and a run-in sensing tool 230. The sub 10 provides strength properties that may exceed the tubular drill pipe string it is expected to be placed in to become part of the drill string, so that it may be 'invisible' to drilling operations. FIG. 1 illustrates the sub 10 having recessed outer walls forming circumferential windows 150 and 170 and an inner bore 220 (the run-in tool is not shown in FIG. 1). The sub 10 may have one or more spacers 20 inserted into the bore of the sub, each spacer having a central or inner bore or passageway to accommodate the run-in tool and allow drilling fluid to flow through this bore, which is the bore 220 of the sub 10. Each spacer 20 (30, 40, 50, 60, 70, 80, 90, 100, 110) is formed of a material that may either allow or prevent the passage of radiation, for example gamma rays. Some of the spacers (40, 60, 80, 100) allow a circumferential gamma ray flux to pass through the sub 10, while other spacers (30, 50, 70, 90, 110) may be radio-opaque, or allow less circumferential and longitudinal (axial) gamma ray flux to pass through the sub 10, and act as shielding inserts. Spacers may be solid bodies or helical shapes (not shown) to allow easier insertion into the inner diameter of the sub 10. The size, shape, and angles of the spacers may depend on the choice of radioactive source material (because of the depth of penetration into the formation, and materials of the sub), the physical size of the sub, mud composition and weight, preferred path of the emitted and returned radiation, etc. The "angle" of the spacer refers here to the angle of the interface 290 between two adjacent spacers (e.g., spacers 40 and 50 in FIG. 4) in relation to a plane perpendicular to the longitudinal axis of the tubing. This interface 290 appears as a conical beveled end of each spacer, which is designed to match and abut a mating bevel on the end of an adjacent spacer. These angles or bevels may be between 0 and 45 degrees, and are preferably closer to the high end of that range (i.e., closer to 45 degrees) for windows 40 and 60 which are closer to the source 240, than for windows 80 and 100, which are further from the source 240, and which may be beveled closer to 20 degrees, and each angle may be oriented "up" or "down" (toward one end or the other end of the sub) from that perpendicular to suit the design's requirements to guide or permit a controlled gamma ray flux to pass through the windows 150, 170 provided in the sub housing's 130 wall and spacers 20, from radio-source 240 or to sensors 250, 260, 270, deployed inside the sub's central bore 220 when a density run-in tool 230 is located in a designated position in the bore 220. The sub 10 may be disassembled and a new or different set of spacers 20 can be inserted and reassembled as a different sub 10 with different window and shield characteristics.

As portions of the outer wall of the sub have been thinned, typically by machining 150 and 170, gamma rays may be further preferentially directed by the recessed portion 150 and 170 of the sub. Gamma rays may penetrate with less attenuation through these recessed portions while being axially focused to an angle that is perpendicular to the longitudinal axis of the sub 10, as demonstrated by FIG. 8, and FWHM of gamma rays through steel wall 510, thereby further focusing gamma rays radially outward to the formation from source 240 and targeting specific areas of a formation (a volume of investigation) from which gamma rays can travel to the detectors. An important feature of the present invention may be direction of the gamma ray paths 320 from source-to-detector to interact by multiple Compton scatterings, rather than a single backscatter 330, preferentially with the formation rather than with any other material such as the annular fluids or the subassembly itself. Without limiting the invention a particle description will be used instead of a wave description of the gamma rays. The transmission of gamma rays through the materials of the sub may occur according to the principles of pair production, Compton scattering, and photoelectric absorption. The gamma rays may be scattered and absorbed (dotted lines in FIGS. 5a and 5b, and FIG. 6) depending on the nuclear properties of the materials encountered and the energy of the gamma ray. The windows 40, 60, 80, 100 preferentially allow gamma rays to transmit through the material by minimizing the electron density of material along the preferred path. This preferred path may be further achieved by shielding material 30, 50, 70, 90, 110 straddling each window to be composed of material with a high electron density thereby preventing gamma rays from transmitting through the material of these shielding inserts 30, 50, 70, 90, 110. An advantage of the present design is leveraging the gamma ray build-up factor to constrain the gamma ray paths so that the path of the gamma ray remains through the windows 40, 60, 80, 100. The outer walls of the sub are thinned (e.g., at 150, 170) at the window locations to further aid in providing a preferential path for the gamma rays, since a high thickness would attenuate the gamma ray penetration exponentially.

The assembly of inserts 20 and the sub outer wall 130 at 150, 170 may act as a window 40, 60, 80, 100 and as a shield 30, 50, 70, 90, 110 to allow gamma rays to transmit through to irradiate the formation 310 near the source 240 and continue to scatter through the formation 310 until near the sensors 250, 260, 270 and return through any of the windows 40, 60, 80, 100 to the detectors (sensors) 250, 260, 270, while eliminating detection of undesirable gamma ray interaction paths within the borehole. In addition, the assembly of inserts 20 and sub outer wall 130 provides axial focusing of the gamma rays. The windows 40, 60, 80, 100 are designed with an axial length to prevent gamma rays that have interacted within the formation in a single Compton backscatter (340 in FIG. 6), or within the borehole (380 in FIG. 6) from being detected by the detectors (particularly 270) The arrangement of the materials for the windows 20 forces the interaction of the preferred paths 320 of the gamma rays (illustrated in FIG. 6) arriving at each of the detectors 250, 260, 270 to be significantly different from each other with respect to the distance traveled in formation 310 to distance traveled in the borehole, thereby allowing compensation for unwanted effects by means familiar to those versed in the art.

The design allows a radiation intensity field exiting the sub to be radially symmetric and axially focused at an angle ranging from substantially 20 to 45 degrees (preferably closer to 45 degrees) tilted toward the detector end and with a full width half maximum (FWHM) intensity spread of less than 108 degrees (FIG. 8 FWHM at 510), from the prior art steel sub 420, to possibly more than 90 degrees (see table and drawings in FIG. 8). Each window for a detector can be designed to allow gamma rays to enter the sub and transmit through to the detector, originating from a volume (field) with a radially symmetric, but axially constrained region tilted at angles of approximately 20 degrees (to 45 degrees as necessary by design) toward the source end.

A gamma ray detector that is reliable for downhole use, for example a detector with an efficiency in the 60-600 keV range, may be used in the present invention. For example, a scintillation detector in combination with a photomultiplier tube may be used to detect radiation. When ionizing radiation enters the scintillation detector, it may produce a fluorescent flash with a short decay time. The flash may be detected by the photomultiplier tube and converted into an electrical charge proportional to the energy of the ionizing radiation. The electrical charge may be measured and recorded.

The gamma ray may transmit through the windows with much greater intensity than through the non-window sections. Assuming a very simplistic approach of considering the gamma rays to transmit only through the windows, and neglect buildup factor, an approximation of 90° for the gamma ray spread angle can be estimated by geometrical means.

The gamma ray angles transmitting through the differentially transmissible collars have been approximated by applying linear attenuation intensity calculations with respect to its geometry, and have arrived at FWHM spreads with respect to the axis of 132° for composite collar, and 108° for steel collar (see FIG. 8). When measuring formation density, there are five parameters involved: detector spacing, collar type and size, mud weight, borehole size, and formation density; with three parameters being held constant, such as detector spacing, collar type and size, and mud weight. With at least three detectors, the remaining variables may be determined through known empirical models.

The material forming the window spacers 40, 60, 80, 100 may comprise thermo-stable synthetic polymers, based on aliphatic or semi-aromatic polyamides, for example nylon 66 or other polymer such as NORYL™, polycarbonate (PC), polyetherimide (PEI), and poly ether ketone (PEEK). Alternatively, the material forming the window spacers that are intended for the gamma ray transmission windows 40, 60, 80, 100 may comprise aforementioned polymer or other low-Z materials such as beryllium, lightweight ceramics, lightweight composites, etc. The material forming the spacers between the windows 30, 50, 70, 90, 110 may comprise of a high-Z material to provide shielding and could be composed of steel, lead, tungsten, etc.

Spacers 30, 50, 70, 90, 110 used in the inner bore may be composed of the same material as the windows 40, 60, 80, 100 or different materials and may have different opacity to target different radiation sources other than gamma rays. Spacers 20 used in the inner bore may be composed of the aforementioned materials for gamma rays, but other materials with different opacity may be used to target radiation sources other than gamma rays.

A thin erosion-durable, cylindrical sleeve (not shown) may also be inserted in the inner bore 220 of the spacers 20 in the sub 10 to hold the spacers in place, and prevent the flow of drilling fluids from eroding the spacers 20. The thickness of the sleeve may vary depending on the material forming the inserts and may be as small as 3 mm, to fit against the inner surface of the spacers 20 in the annulus 300 between the spacers 20 and the density run-in tool 240 in the bore 220, with enough space between the sleeve and run-in tool 240 to permit drilling fluid flow.

In operation, the run-in tool 240 is pumped down or lowered through the drill string on a cable at the end of the bit run and positioned inside the sub 10 as shown in FIG. 4, this may be accomplished by a mechanism referred to as the landing pump down assembly. Optionally, the run-in tool 240 could be received by a landing "shoe" within the inner bore of the sub 10 (not shown). The landing shoe (not shown) preferably also has latching means to prevent axial motion of the run-in tool once it is engaged inside the sub 10. Any means for engaging the tool may be an alternative embodiment design. The run-in tool 240 may be configured to include various components: batteries, a processor, a clock, a data read-out port, memory, a gamma ray source and gamma ray detectors, and other components that may be known in the art.

The subassembly 10 provides an inner bore size 220 permitting fluids to flow through the sub with negligible restriction when the run-in tool is not present. In addition, the subassembly 10 may allow fluids to flow through the annulus 300 between the run-in tool 240 and inner wall of the bore of the sub to be sufficient for tripping and reaming operations while the run-in tool is present. The simple component configuration design of the subassembly allows for ease of assembly and disassembly and the ease of component inspection and replacement.

Experimental Data

Figure 10:
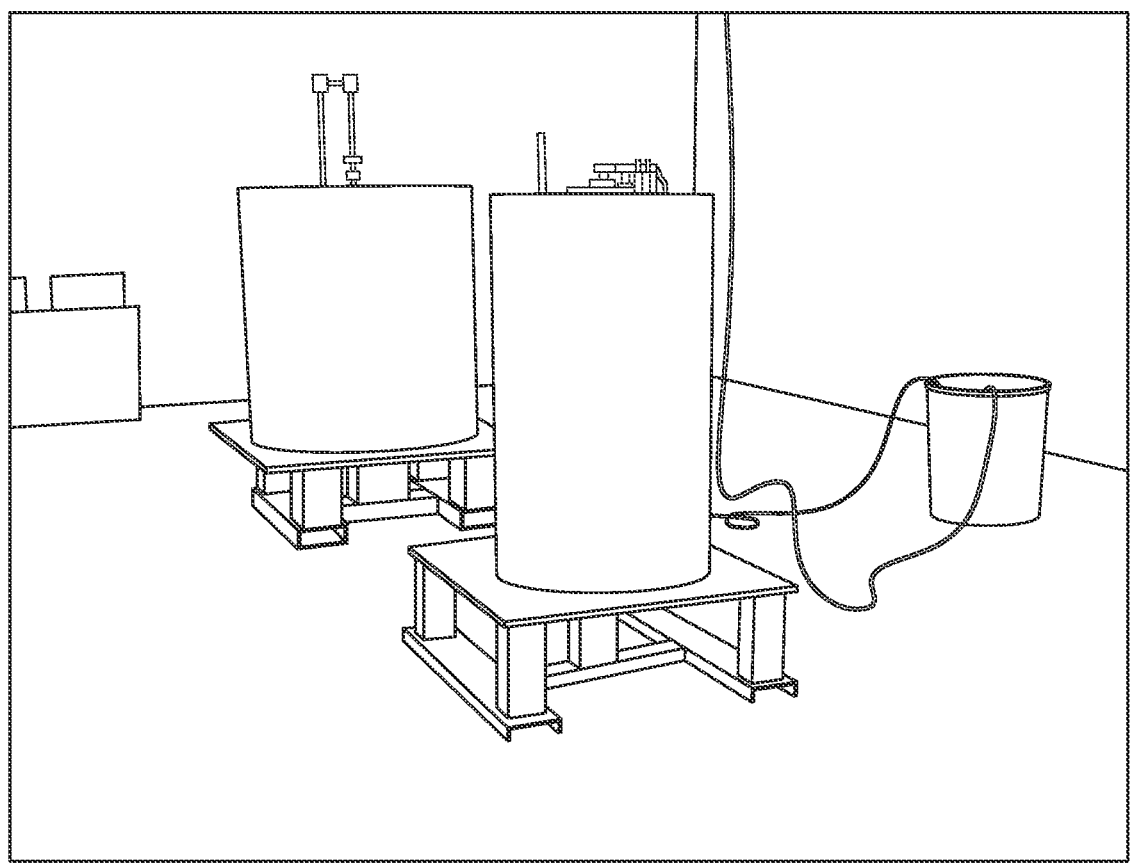
FIG. 10 is a photograph showing two cylindrical density calibration blocks.
Figure 11:
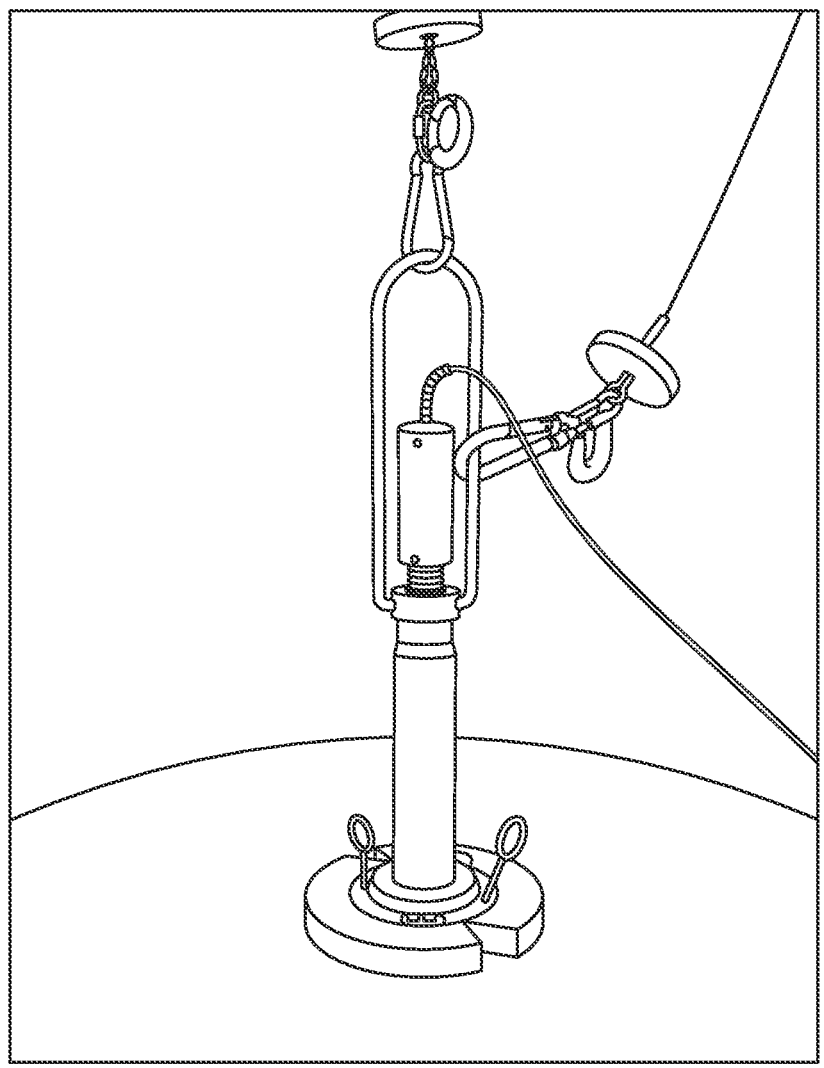
FIG. 11 is a photograph showing a density run-in tool being inserted into calibration block.

Testing was performed in the calibration blocks (shown in FIG. 10 and FIG. 11 and with results in graph in FIG. 9) to compare improvements using this invention to existing designs by allowing the independent variable to be the change of material (i.e. the logging subs or lack thereof) around the density tool from the current commercial design. A dependent variable will be a relative difference in scintillation count rates at the detectors between two calibration blocks of differing density. The controlled variables in the testing may be density of the calibration blocks, presence and density of the annular fluids, and positioning of the test equipment in the blocks.

The key performance indicator (KPI) calculated from the tests (see FIG. 9) and used for assessment of design improvements is a percent difference of count rates, for a given detector within a specified logging tubular assembly, between the calibration blocks of two different bulk densities, while keeping all other variables constant. In simpler words, the KPI value indicates how responsive the detector is to a change in density of the "formation" it is intended to measure. Thus, a greater KPI value for a detector in one test assembly compared to another test assembly indicates it will respond better to a change of block density, hence a better response to formation density.

Sample Test Results and Method—

Data from five of the six tests below is represented in FIG. 9. (the calibration results are not shown).

Equipment:

The equipment and facility used for calibration of the density logging tools used in commercial business operations were also be used for this performance testing of the present invention's "test tube". The test facility had two calibration blocks, overhead winches, a forklift, radioactive source storage, and equipment for powering the density tools and recording data.

Calibration Blocks:

Two large cylindrical blocks with a circular hole through the central axis of 156 mm (see FIG. 10), which may be typical of a small oilfield borehole size, were used. Both blocks were set on a platform with an "overhole" pipe that allowed extra length of the bottom of the density run-in tool to sit below the block, which helped to retain the water column within the calibration blocks.

One block was aluminum with a bulk density of 2.71 $g/cm^3$ and the other block was concrete with expanded polyethylene added to the aggregate so that it had a bulk density of 1.66 $g/cm^3$.

Both blocks had a height significantly greater than the source to detector spacing of the density tool and had a radius many times greater than the depth of investigation of the density tool. This ensured that any Compton scattering interactions that occurred to the gamma rays on the source-to-detector path were contained mostly within the calibration blocks and interactions outside of the blocks were negligible.

Composite Collar Calibration Section (Serial #58A3):

The density tool was positioned inside of a section of one of the current commercially used composite collar tubulars. Its length was equivalent to the height of the blocks, and had a density of approximately 2 $g/cm^3$. This was used to calibrate the density run-in tools (see FIG. 11) for commercial operations.

4FH Tube Steel Sleeve:

A section of steel tubular was used with an internal and external diameter equivalent to a 4FH steel collar currently used commercially for formation density measurement through it. Its length is equivalent to the height of the calibration blocks.

Test Mock-Up:

An assembly, designed to fit into the calibration blocks while still materially representing an actual sub 10 in terms of nuclear interactions, was tested. The oilfield threaded connections were not present and were replaced by endcaps that could be threaded by hand in the lab to facilitate access the spacers.

The spacers were identical to the proposed prototype drawings and were made of steel and nylon (1.14 g/cm3).

The density sub housing for testing had a modified design, whereby the larger outer diameter segments between the windows were not present since they were too large to fit into the calibration blocks. However, the internal diameter and outer diameter were the same as the density collar described in the specification.

It was assumed that the larger outer diameter sections between the windows would reduce the undesirable gamma ray paths through the outer annulus of drilling fluid, such that the removal of these outer diameter sections could slightly reduce the effectiveness of the sub. Therefore, the test of this "test tube" assembly could produce a KPI value slightly lower than if the thicker OD sections were present between the windows. Refer to patent application US20060065394A1 FIGS. 6 and 7 that show how an external shield between a tubular and borehole wall reduces unwanted transmission of gamma rays through the borehole.

Density Run-in Tool (Serial #1481008):

This was one of a series of identical density run-in tools that can be used in the future commercial application of this invention.

Cs-137 of 74 GBq nominal activity
Serial #63563B
Serial #63561B

Procedure

The testing done was from a combination of recent tests on the test mock-up assembly "test tube", and a collection of tests performed historically in an identical fashion. A verification test was also done to confirm that the present test facility and assembly produced repeatable results, so that the further testing can be considered reliable.

Data from five of the six tests below is represented in FIG. 9.

Test 1: Air Bore (Completed on Jun. 19, 2012)

A worst-case scenario, or boundary condition test was performed, where there was no tubular nor significantly dense fluid to help force gamma ray interactions to occur through the formation. We observed an air filled bore with no tubular sub present. Most of the gamma rays were expected to short-circuit up to the detectors through the air-filled annulus.

Test Assembly:
  Concrete and Aluminum calibration blocks;
  Air filled bore;
  No tubular present;
  Density tool 1481008 centralized in bore; and
  Cs-137 source #63563B.

Procedure:
  1a. Drained water in the calibration blocks;
  1b. Powered up the density tool electronics and allowed for warm-up and stabilization;
  1c. Inserted source into density tool;
  1d. Set the density tool centralized in one block and recorded count rates;
  1 e. Moved density tool to another calibration block;
  1f. Set density tool centralized in the second block and recorded count rates; and
  1g. Removed density tool, and de-sourced.

Test 2: Water Bore (Completed on Jun. 19, 2012)

An operational scenario, where there was no tubular surrounding the density tool, but the bore was filled with fluid, was performed. This was an effective method of logging with a density tool using small boreholes. We observed a water filled bore with no tubular sub present. A significant proportion of the gamma rays were expected to short-circuit up to the detectors through the water-filled annulus.

Test Assembly:
  Concrete and Aluminum calibration blocks;
  Water filled bore;
  No tubular present;
  Density tool 1481008 centralized in bore; and
  Cs-137 source #63563B.

Procedure:
  2a. Fill bore with water in the calibration blocks;
  2b. Powered up the density tool electronics and allow to warm-up and stabilize;
  2c. Inserted source into density tool;
  2d. Set density tool centralized in one block and recorded count rates;
  2e. Moved density tool to other calibration block;
  2f. Set density tool centralized in another other block and recorded count rates; and
  2g. Removed density tool, and de-sourced.

Test 3: Composite Collar (Completed on Aug. 30, 2012)

Testing the performance of a typical composite material collar that is used on most commercial operations. This is the baseline that most other tests will be compared to for assessing improvement of performance when changing a parameter.

We observed a water filled bore with the composite tubular body, as in the prior art.

Test Assembly:
  Concrete and Aluminum calibration blocks;
  Water filled bore;
  Composite section of tubular serial #58A3 centralized in bore;
  Density tool 1481008 centralized in Composite section; and
  Cs-137 source #63563B.

Procedure:
  3a. Hung Composite test section centralized in one block;
  3b. Filled bore with water in the calibration block;
  3c. Powered up the density tool electronics and allow to warm-up and stabilize;
  3d. Inserted source into density tool;
  3e. Set density tool centralized in test section in the one block and recorded count rates;
  3f. Moved density tool and composite test section to the other calibration block;
  3g. Set density tool centralized in test section in the other block and recorded count rates; and
  3h. Removed density tool, and de-sourced.

Test 4: Steel Collar (Completed on Aug. 9, 2013)

The performance of a typical steel material tubular that is used on some commercial operations was tested. This was a performance test conducted to determine how effectively the density tool would obtain formation logging data when placed in a steel tubular that is operationally interchangeable with the composite collar section tested in Test 3.

We observed a water filled bore with steel tubular body of the prior art.

Test Assembly:
  Concrete and Aluminum calibration blocks;
  Water filled bore;
  Steel section of tubular "4FH Tube Steel Sleeve" centralized in bore;
  Density tool 1481008 centralized in Steel section; and
  Cs-137 source #63563B.

Procedure:
  4a. Hung steel test section centralized in one block;
  4b. Filled bore with water in the calibration block;
  4c. Powered up the density tool electronics and allow to warm-up and stabilize;
  4d. Inserted source into density tool;
  4e. Set density tool centralized in test section in the one block and record count rates;
  4f. Moved density tool and steel test section to the other calibration block;
  4g. Filled bore with water in this calibration block;
  4h. Set density tool centralized in test section in the other block and recorded count rates; and
  4i. Removed density tool, and de-sourced.

Test 5: Composite Collar Verification (Dec. 13, 2017)

This test was conducted to test reliability of data. The test qualified that use of the test facility and equipment has not significantly changed, and gave confidence to the reliability of the results of further testing. Results not included in the bar graph.

Due to the source #63563B being temporarily unavailable, an identically nominal source from the same supplier batch was used in its place. Knowledge from other tests done in 2013 showed that interchanging nominally identical sources produced insignificant variations to performance results.

We observed a water filled bore with composite collar tubular.

Test Assembly:
  Concrete and Aluminum calibration blocks;
  Water filled bore;
  Composite section of tubular serial #58A3 centralized in bore;
  Density tool 1481008 centralized in Composite section; and
  Cs-137 source #63561B.

Procedure:
  5a. Hung Composite test section centralized in one block;
  5b. Filled bore with water in the calibration block;
  5c. Powered up the density tool electronics and allow to warm-up and stabilize;
  5d. Inserted source into density tool;
  5e. Set density tool centralized in test section in the one block and recorded count rates;
  5f. Moved density tool and composite test section to the other calibration block;
  5g. Filled bore with water in this calibration block;
  5h. Set density tool centralized in test section in the other block and recorded count rates; and
  5i. Removed density tool, and de-sourced.

Test 6: Present Invention Test Tube (Dec. 13, 2017)

With confidence in the previous verification test, this "test tube" assembly test was conducted to prove the utility of the present invention.

Due to the source #63563B being temporarily unavailable, an identically nominal source from the same supplier batch was used in its place. Knowledge from other tests done in 2013 showed that interchanging nominally identical sources produced insignificant variations to performance results.

Test Assembly:
  Concrete and Aluminum calibration blocks;
  Water filled bore;
  Test tube assembly of drawing D001194rev0;
  Density tool 1481008 centralized in test tube; and
  Cs-137 source #63561B.

Procedure:
  6a. Assembled the inserts into test tube;

6b. Placed PVC spacer inside test tube (for aligning spacers with density tool and block);
6c. Set test tube in one calibration block;
6d. Filled bore with water in the calibration blocks;
6e. Powered up the density tool electronics and allow to warm-up and stabilize;
6f. Inserted source into density tool;
6g. Set density tool centralized in test tube in the one block and recorded count rates;
6h. Moved test tube and density tool to the other calibration block;
6i. Set density tool centralized in test section in the other block and recorded count rates; and
6j. Removed density tool, and de-sourced.

A legend is provided here for ease of reference to the reference numbers in the Figures:

| Component | Description |
|---|---|
| 10 | sub |
| 20 | spacers |
| 30 | shielding spacer |
| 40 | window spacer |
| 50 | shielding spacer |
| 60 | window spacer |
| 70 | shielding spacer |
| 80 | window spacer |
| 90 | shielding spacer |
| 100 | window spacer |
| 110 | shielding spacer |
| 120 | pin-end adaptor |
| 130 | housing |
| 140 | box-end adapter |
| 150 | detector housing window |
| 160 | housing wear band shield |
| 170 | source housing window |
| 180 | pin-end drill pipe connection |
| 190 | shop connection on pin-end |
| 200 | shop connection on box-end |
| 210 | box-end drill pipe connection |
| 220 | inner annulus |
| 230 | run-in tool |
| 240 | source |
| 250 | short-space detector |
| 260 | mid-space detector |
| 270 | long-space detector |
| 280 | run-in tool connector |
| 290 | tapered interface |
| 300 | run-in tool to sub annulus |
| 310 | formation |
| 320 | preferred gamma ray path |
| 330 | single Compton backscatter gamma ray path |
| 340 | single Compton backscatter gamma ray path |
| 350 | undesirable gamma ray scattering path within sub |
| 360 | shielded gamma ray scattering path within sub |
| 370 | undesirable gamma ray scattering path through borehole |
| 380 | shielded gamma ray scattering path through borehole |
| 390 | composite body |
| 400 | box end tool joint |
| 410 | pin-end joint |
| 420 | steel tubular |
| 430 | generalized wall material |
| 440 | wall thickness |
| 450 | radioactive source |
| 460 | perpendicular path |
| 470 | perpendicular path transmitted intensity |
| 480 | possible path at angle |
| 490 | weaker intensity transmitted at angle |
| 500 | longer distance through wall |
| 510 | full width half maximum (FWHM) for prior art steel tubular |
| 520 | FWHM for prior art composite tubular |

The invention claimed is:

1. A sub adapted for injection into a wellbore as a part of a tubing string into a formation for receiving and aligning with a separate run-in tool with a radioactive source and sensors, the sub comprising:
   (a) an elongated body;
   (b) an inner bore formed of stacked adjacent multi-material cylindrical spacers within an inner conduit in the body of the sub, the spacers having different radiation transparencies; and
   (c) an outer wall of the body of the sub having recessed portions along an outside diameter,
   the more transparent spacers combined with the recessed outside diameter forming circumferential windows in the sub wall configured to align with the run-in tool with the radioactive source and sensors when the run-in tool is located inside the sub's inner bore and the source, sensors, shields and windows provided by the cylindrical spacers different transparencies, and windows provided by the recessed portions are thereby spatially configured to guide a radioactive energy's path from the source into the formation and back to one or more of the sensors.

2. The sub in claim 1, wherein a sub recessed outer wall and higher transparency spacers are windows which provide axial focusing of radioactive energy from the radioactive source.

3. The sub in claim 1, wherein the radioactive source provides gamma rays.

4. The sub in claim 1, wherein the with the sub is located in a wellbore in a formation, the sub spacer outer wall and windows guide gamma rays from the run-in tool's source to transmit through the sub's wall and spacers to irradiate the formation and return through the windows to detectors in the run-in tool while the run-in tool is in the sub avoiding undesirable gamma ray interaction paths within the wellbore or sub.

5. The sub in claim 1, wherein the windows have an axial length that minimizes detection of gamma rays that have interacted within the formation by single Compton backscatter.

6. The sub in claim 1, with a tubular inner wear liner disposed in an annular space between the spacers' inner walls and the run-in tool with radioactive source and sensors when the run-in tool is injected into the sub.

* * * * *